(12) United States Patent
Altmann et al.

(10) Patent No.: US 7,159,517 B2
(45) Date of Patent: Jan. 9, 2007

(54) METHOD OF MARKING OR LETTERING METALLIC COMPONENTS

(75) Inventors: Lutz Altmann, Nienwohld (DE); Walter Czametzki, Meddewade (DE); Alexander P. Sator, Hamburg (DE)

(73) Assignee: Sator Laser GmbH, Hamburg (DE)

( * ) Notice: Subject to any disclaimer, the term of this patent is extended or adjusted under 35 U.S.C. 154(b) by 269 days.

(21) Appl. No.: 10/478,464

(22) PCT Filed: Jan. 25, 2002

(86) PCT No.: PCT/EP02/00773

§ 371 (c)(1),
(2), (4) Date: Jun. 1, 2004

(87) PCT Pub. No.: WO02/096593

PCT Pub. Date: Dec. 5, 2002

(65) Prior Publication Data

US 2004/0206263 A1   Oct. 21, 2004

(30) Foreign Application Priority Data

May 26, 2001  (EP) .................................. 10125794

(51) Int. Cl.
*B41M 3/00* (2006.01)
*B41J 2/435* (2006.01)

(52) U.S. Cl. ...................................... 101/483; 347/224
(58) Field of Classification Search ................ 347/224; 430/303, 322; 219/121.66; 101/483
See application file for complete search history.

(56) References Cited

U.S. PATENT DOCUMENTS

| 4,547,649 | A | * | 10/1985 | Butt et al. ............. 219/121.66 |
| 5,919,853 | A | | 7/1999 | Condit et al. ................ 524/413 |
| 6,130,026 | A | * | 10/2000 | Bennett et al. ............. 430/303 |
| 6,238,847 | B1 | * | 5/2001 | Axtell et al. ................ 430/322 |

FOREIGN PATENT DOCUMENTS

| DE | 41 25 500 A1 | 2/1993 |
| DE | 198 41 168 A1 | 3/2000 |

* cited by examiner

*Primary Examiner*—Hai Pham
*Assistant Examiner*—Carlos Martinez, Jr.
(74) *Attorney, Agent, or Firm*—Vidas,Arrett&SteinkrausPA

(57) ABSTRACT

A method for marking or lettering metallic components, specifically those consisting of titanium and titanium alloys, characterized by the steps of:
    covering the area requiring lettering or marking with a writing ink or writing gel
    marking or lettering the area by means of a laser scanner.

1 Claim, No Drawings

METHOD OF MARKING OR LETTERING METALLIC COMPONENTS

CROSS-REFERENCE TO RELATED APPLICATIONS

This present application is a national stage application of PCT/EP02/00773 with an International filing date of Jan. 25, 2002 claiming priority from German patent application No. 101 25 794.5 filed on May 26, 2001, all of which are incorporated herein by reference in their entirety.

STATEMENT REGARDING FEDERALLY SPONSORED RESEARCH

Not Applicable

BACKGROUND OF THE INVENTION

This invention relates to a method for marking or lettering metallic components, specifically those consisting of titanium or titanium alloys.

It is known to letter or mark metallic components using lasers. For example, this is accomplished by means of a mask which contains the lettering or marking. However, it is also possible to apply a marking or lettering directly by appropriately sweeping a laser beam. As a result, a thermal deformation takes place in the microstructure of the metallic component in the area close to the surface. Although such a marking is permanent it possibly has an adverse effect with regard to the strength of the metallic component.

Further, it is known to apply a paste to a metallic component and to treat it thermally using a laser light in order that a fixed union be established between the paste which is applied and the metallic component. The disadvantages are the expenditure that the known method involves and the fact that it is possible to remove such a lettering or marking.

BRIEF SUMMARY OF THE INVENTION

It is the object of the invention to mark or letter a metallic component, specifically one made of titanium or a titanium alloy in which a permanent lettering or marking is performed with the surface of the metallic component not being attacked in a detrimental fashion.

The object is achieved by the features of patent claim 1.

DETAILED DESCRIPTION OF THE INVENTION

In the invention, a writing ink or writing gel is applied to the area which requires marking or lettering. Such writing or marking inks are used in very varied writing utensils, for example and, amongst other things, are employed to mark metallic components. After its application, it is readily possible to remove the ink which was applied and has dried. In the inventive method, lettering is done by means of a laser scanner subsequent to the application of the writing gel or writing ink. At this stage, a thermal diffusion process takes place which causes particles or molecules of the writing gel or writing ink, within the area hit by the laser beam, to penetrate into the area close to the surface, but still to remain readily visible. It will then be no longer possible to remove the lettering or marking without removing metallic material. Then, the writing ink or the like which is outside the lettering or marking may be readily removed with a suitable agent, e.g. a solvent or the like.

Most writing inks contain graphite in a finely dispersed distribution. The effect described can be observed in liquids of this type. Obviously, a carbonization occurs in the metal, specifically in titanium or titanium alloys.

The invention allows to use a laser scanner for marking metallic components without causing them to be harmed in any way in their structure or strength. The further advantage of the inventive method is that the laser beam does not need to be so rich in energy as it does when metallic components of the prior art are engraved.

The inventive method is suited for use with all workpieces consisting of metal, but specifically with those consisting of titanium and titanium alloys.

The invention claimed is:

1. A method for lettering or otherwise marking metallic components, specifically those consisting of titanium and titanium alloys, wherein a substance is supplied to an area requiring lettering and said area is lettered by means of a laser scanner, the method comprising the steps of:

applying a writing ink or writing gel containing graphite in a dispersed form to an area requiring lettering or marking;

using a laser beam to cause the metal to undergo carbonization; and followed by removal of any said substance which has not undergone carbonization leaving only lettering or marking on the metallic component by thermal diffusion of the carbonized graphite into the metal and not above the metal.

* * * * *